US008681359B2

(12) United States Patent

Bitoh

(10) Patent No.: US 8,681,359 B2

(45) Date of Patent: Mar. 25, 2014

(54) NAIL PRINTER AND PRINT CONTROLLING METHOD

(75) Inventor: Hiroyasu Bitoh, Ome (JP)

(73) Assignee: Casio Computer Co., Ltd., Tokyo (JP)

( * ) Notice: Subject to any disclaimer, the term of this patent is extended or adjusted under 35 U.S.C. 154(b) by 159 days.

(21) Appl. No.: 13/095,119

(22) Filed: Apr. 27, 2011

(65) Prior Publication Data

US 2011/0304877 A1 Dec. 15, 2011

(30) Foreign Application Priority Data

Jun. 10, 2010 (JP) ................................ 2010-132537

(51) Int. Cl.

*G06F 15/00* (2006.01)

(52) U.S. Cl.

USPC .......... 358/1.15; 358/502; 358/1.18; 358/1.8; 132/73; 347/2; 347/3; 347/5; 347/14

(58) Field of Classification Search

None

See application file for complete search history.

(56) References Cited

U.S. PATENT DOCUMENTS 5,915,078 A * 6/1999 Miyasaka et al. ............ 358/1.12
5,931,166 A * 8/1999 Weber et al. .................... 132/73
6,067,996 A * 5/2000 Weber et al. .................... 132/73
6,286,517 B1 * 9/2001 Weber et al. .................... 132/73
6,336,694 B1 * 1/2002 Ishizaka ............................ 347/2
6,363,943 B1 * 4/2002 Jenkins et al. .................. 132/73
6,525,724 B1 * 2/2003 Takami .......................... 345/419
6,981,254 B2 * 12/2005 Parry ............................ 718/100
8,085,415 B2 * 12/2011 Nagami ........................ 358/1.14
2004/0194648 A1 * 10/2004 Uchida ............................ 101/35
2005/0174367 A1 * 8/2005 Kondo et al. ..................... 347/3
2009/0153604 A1 * 6/2009 Chen et al. ........................ 347/9

FOREIGN PATENT DOCUMENTS

JP 2000-194838 7/2000
JP 2003-534083 A 11/2003

OTHER PUBLICATIONS

Japanese Office Action dated Apr. 10, 2012 (and English translation thereof) in counterpart Japanese Application No. 2010-132537.

* cited by examiner

*Primary Examiner* — King Poon
*Assistant Examiner* — Ted Barnes
(74) *Attorney, Agent, or Firm* — Holtz, Holtz, Goodman & Chick

(57) ABSTRACT

A nail printer and printing method for printing on nails of fingers in a short time. Printing of nails starts a predetermined time after a print start command is given by a print switch or a both-hand switch. When nails of thumbs or fingers of both right and left hands are printed with an image, a print switch is operated by one of the hands, the thumbs or fingers of the both hands are fixed at a predetermined printing position within a printed finger receiver and then the nails of both the thumbs or fingers are printed with a design or pattern.

5 Claims, 14 Drawing Sheets

NAIL PRINTER AND PRINT CONTROLLING METHOD

CROSS-REFERENCE TO RELATED APPLICATION

This application is based on Japanese Patent Application No. 2010-132537 filed on Jun. 10, 2010 and including specification, claims, drawings and summary. The disclosure of the above Japanese patent application is incorporated herein by reference in its entirety.

BACKGROUND OF THE INVENTION

1. Field of the Invention

The present en on relates to printers, and more particularly to a nail printer which prints favorite designs or pattern on nails of fingers placed on a finger rest therein.

2. Description of the Related Art

In the past, many of nail printers print a user's favorite design or pattern on a nail of a respective one of the user's fingers inserted one by one therein. Recently, nail printers have been developed in which a plurality of nails on thumb and/fingers of a user's one hand inserted therein are successively printed with a pattern or design as a result of the advancement of a technique for fixing the thumb/fingers inserted therein and for discriminating the respective types of the thumb/fingers, as disclosed in JP2003-534083. With such printers, however, a design or pattern can not be printed successively on the nails of the both groups of fingers or both thumbs of both the user's right and left hands. In order to print on the nails of the both groups of fingers or both thumbs of the both right and left hands, it is required that the thumb or fingers and hence their nails of one hand be first placed in position in the printer, a pattern or design is printed on the nails, and then these processings be performed on the nails of thumb or fingers of the other hand, which takes much time and effort.

SUMMARY OF THE INVENTION

An object of the present invention is to provide a nail printer capable of printing on the thumbs or fingers of both the user's hands successively without requiring much time and effort.

In one aspect, the present invention provides a nail printer comprising: a printed finger receiver into which fingers of both right and left hands whose nails should be printed with an image are inserted; print controlling means for printing the image on the respective nails of the fingers; an operation member operable for giving a print start command; and control means for controlling the print controlling means so as to start to print the image on the nails a predetermined time after the print start command is given by the operation member.

According to the present invention, the printing starts a predetermined time after manual operation of the operation member. Thus, even when the same finger(s) of a user's (for example, right) hand as has operated the operation member are inserted into the printed finger receiver within the predetermined time after operating the operation member, the image (including a pattern or design) is printed on the nails of the fingers of the right hand without requiring much time and effort. When the fingers of the user's right and left hands are inserted into the printed finger receiver within a predetermined time after operating the operation member, the image is printed successively on the nails of the fingers, including two thumbs or two groups of fingers of the right and left hands. Thus, time and effort required for this operation is reduced.

Other objects, advantages, and features of the present invention will be apparent from the following detailed description of preferred embodiments.

DETAILED DESCRIPTION OF THE INVENTION

First Embodiment

Figure 1:
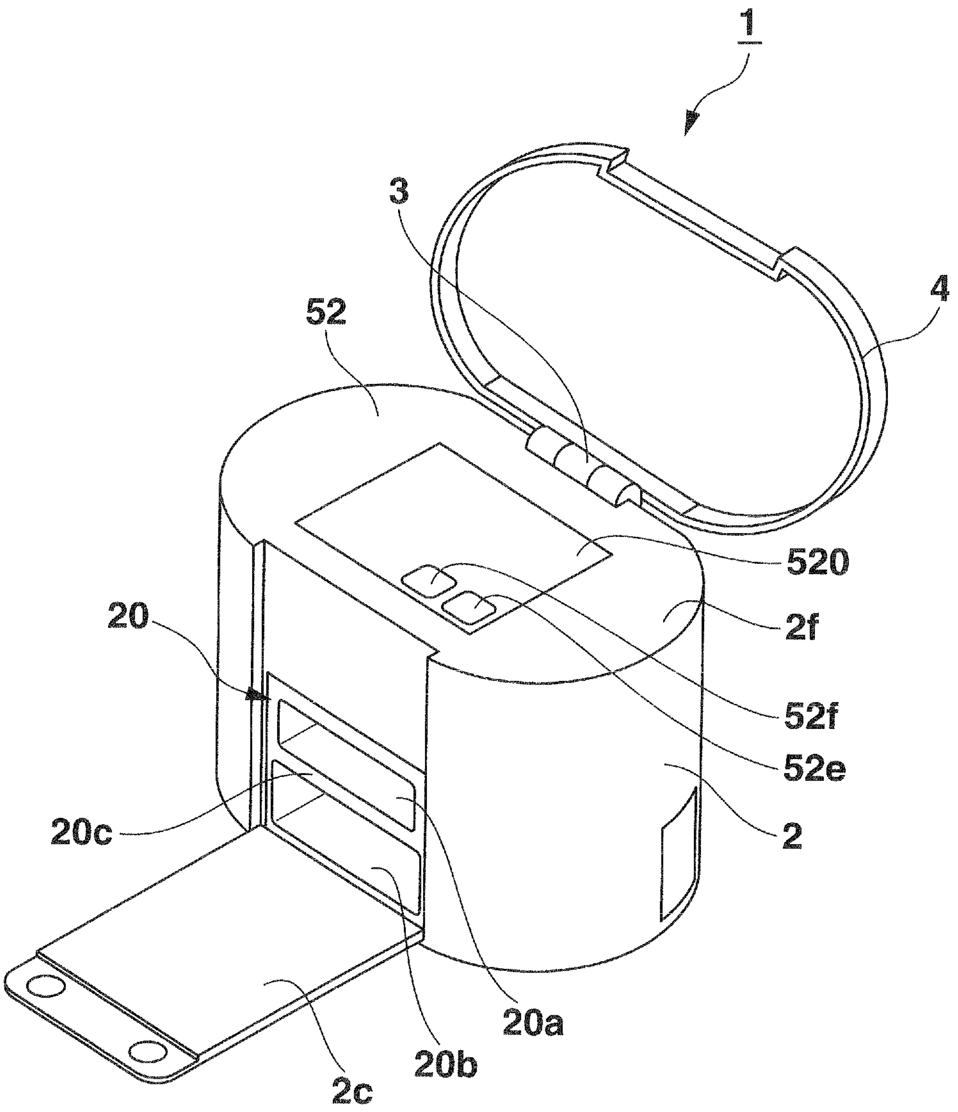
FIG. 1 is a schematic perspective view of one embodiment of a nail printer according to the present invention with top and front covers open.

Referring to FIGS. 1-10, a first embodiment of a nail printer according to the present invention will be described. As shown in FIG. 1, the nail printer 1 is comprised of a case 2 substantially elliptical in plan view and a top cover 4 hinged at 3 to a top rear edge of the case 2. The case 2 also has an openable front cover 2*c* hinged at its lower end to a front lower end of the case 2. A control panel 52 is provided substantially at the center of a top 2*f* of the case 2 so as to cover the top of the case 2. The shapes of the case 2 and the top cover 4 are not limited to the illustrated ones.

The case 2 encases a printer body 10 which comprises a finger holder 20, an image catcher 30, a printing unit 40, and a controller 50 as control means (FIG. 8) provided on a frame. The frame is comprised of a lower box-like sub-frame 11*a* disposed at a lower position within the case 2 and an upper sub-frame 11*b* disposed over the lower frame 11*a* at an upper position within the case 2.

Figure 3:
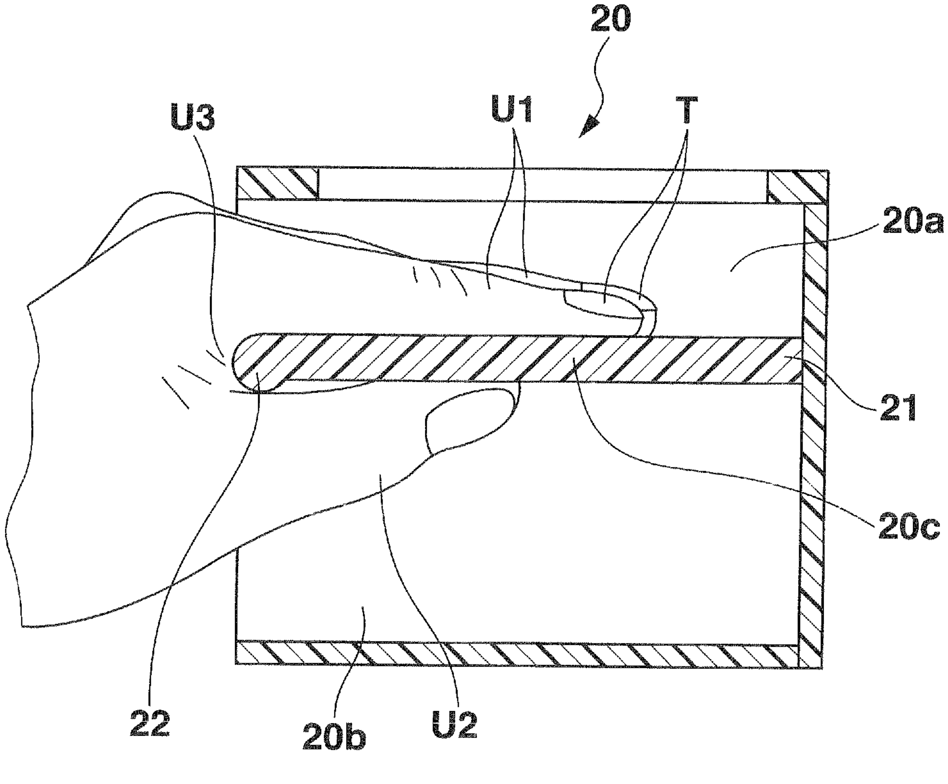
FIG. 3 is a schematic cross-sectional view of the nail printer of FIG. 1, showing the thumb and fingers of a left hand which hold a finger hold plate.

The finger holder 20 is provided on the lower frame 11*a* and comprised of a printed finger receiver 20*a* with a front open end provided on the lower sub-frame 11*a* for receiving therein through the open end a thumb or fingers whose nails should be printed U1 with a design or a pattern (FIG. 3). The finger holder 20 also is provided with a non-printed finger receiver 20*b* with a front open end provided underneath the printed finger receiver 20*a* for receiving therein through its open end fingers whose nails should not be printed U2 with a hold wall 20*c* provided between the printed and non-printed finger receivers 20*a* and 20*b*. In printing, the thumb or fingers U1, for example of a left hand, received in the printed and non-printed receivers 20*a* and 20*b* cooperate to hold the intermediate hold wall 20*c* tightly therebetween, as shown in FIG. 3.

The hold wall 20*c* has an upper flat surface on which the thumbs or fingers whose nails should be printed are placed. This hold wall 20*c* has a semicircular, somewhat downwardly expanded cross-sectional end portion 22 at the front open end of the finger holder 20 such that the joint between the fingers U1, for example of a left hand, and the thumb U2 of the left hand inserted deeply into the printed and non-printed receivers 20*a* and 20*b*, respectively, contacts the left semicircular cross-sectional end portion of the holder wall 20*c* so as to allow the fingers and thumb to cooperate to hold the hold wall 20*c* tightly therebetween. The cross-sectional shape of the left end portion of the hold wall 20*c* is not limited to the illustrated one, but may be elliptical, polygonal or any other shape suitable for holding the hold wall 20*c*.

FIG. 3 illustrates one specified example of a manner in which the four (first-fourth) fingers U1 of the left hand are fixed. In this case, as shown in FIG. 3, the user holds the hold wall 20*c* tightly with her fingers U1 received in the printed finger receiver 20*a* and her thumb U2 received in the non-printed finger receiver 20*b*, thereby fixing the fingers U1 to the hold wall 20*c*.

Figure 4:
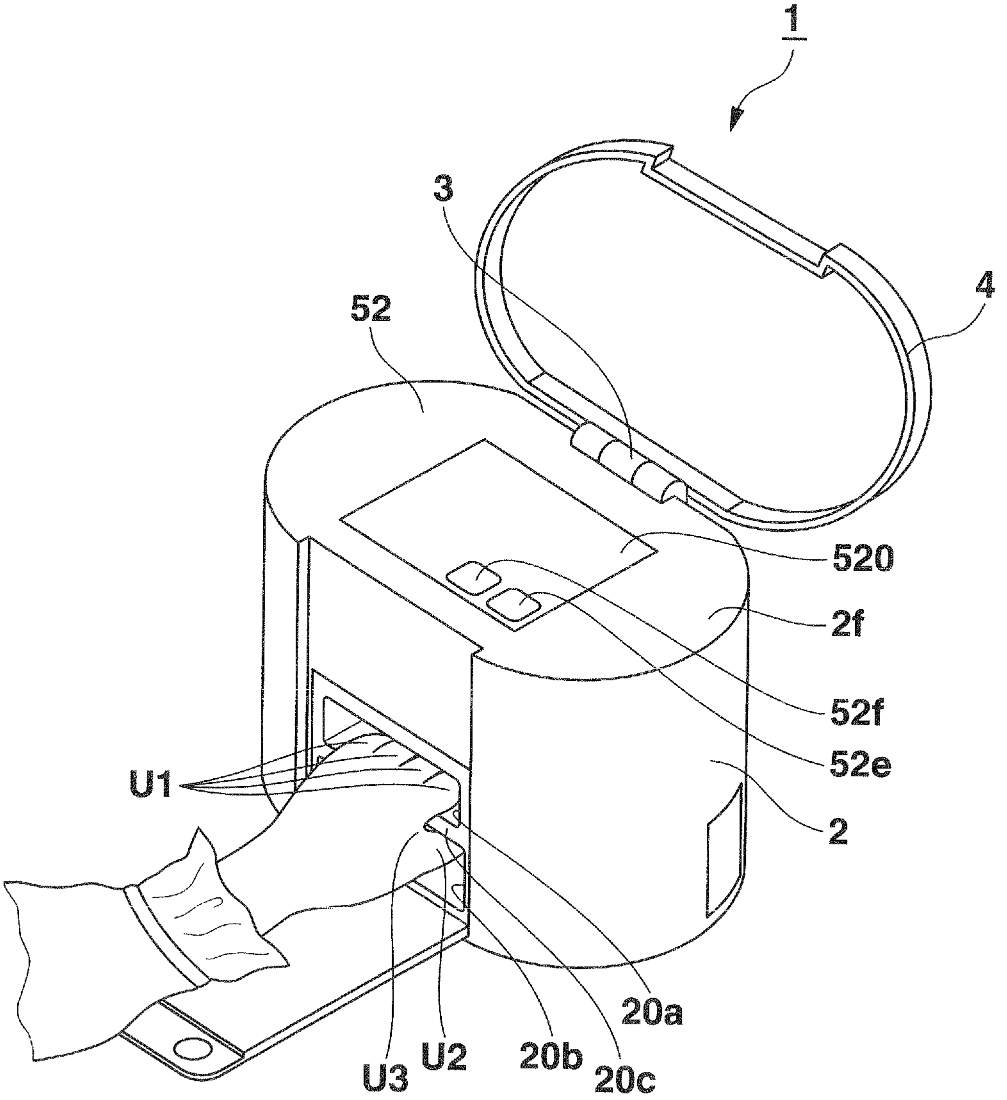
FIG. 4 is a perspective view of the nail printer showing fingers of a left hand inserted into the printed finger receiver of the printer.
Figure 5:
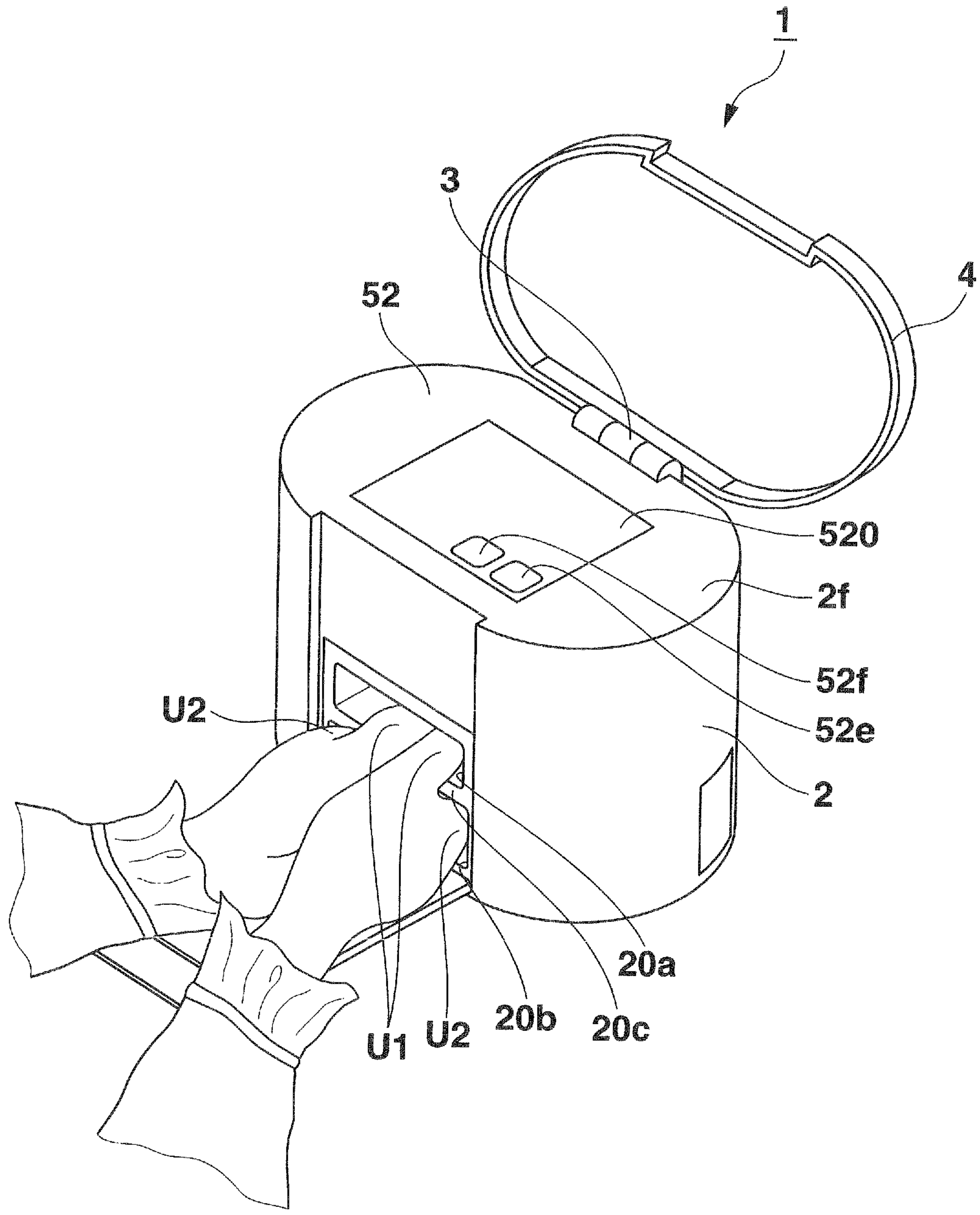
FIG. 5 is a perspective view of the nail printer of FIG. 5, showing both thumbs of the right and left hands inserted into the printed finger receiver.

FIG. 4 illustrates one example of a manner in which fingers of a user's left hand whose nails should be printed U1 are received in the printed finger receiver 20*a*. FIG. 5 illustrates one example of a manner in which the user's both thumbs whose nails should be printed U1 are received in the printed finger receiver 20*a*.

FIG. 4 illustrates that the four (first-fourth) fingers U1 of the left hand excluding its thumb can be ones whose nails should be printed. In this case, the four fingers U1 are received in an in-plane arrangement in the printed finger receiver 20*a* and the thumb U2 is received within the non-printed finger receiver 20*b*. Then, the fingers U1 and the thumb U2 cooperate to hold the hold wall 20*c* to fix the fingers U1 to the hold wall (FIG. 3).

FIG. 5 shows the thumbs U1 of both right and left hands, whose nails should be printed, received in the printed finger receiver 20*a* with the fingers of the both hands received in the non-printed finger receiver 20*b* such that the two thumbs of the both right and left hands cooperate with the two groups of fingers of the both right and left hands to hold the hold wall 20*c* so as to cause the nails of both the thumbs to be printed with a favorite image (including a favorite pattern or design).

When a nail of a thumb U1 of one of the right and left hands is desired to be printed, the thumb U1 is inserted into the printed finger receiver 20*a* and the fingers U2 of the hand are inserted in an in-plane arrangement into the non-printed finger receiver 20*b*. Like this, when a nail of a thumb U1 of one of the right and left hands is desired to be printed, the thumb U1 may be inserted into the printed finger receiver 20*a* and the four fingers U2 of the hand may be inserted in the in-plane arrangement into the non-printed finger receiver 20*b*. Also, in this case, the thumb U1 and the fingers U2 cooperate to hold the hold wall 20*c* tightly therebetween for printing purposes.

Figure 6:
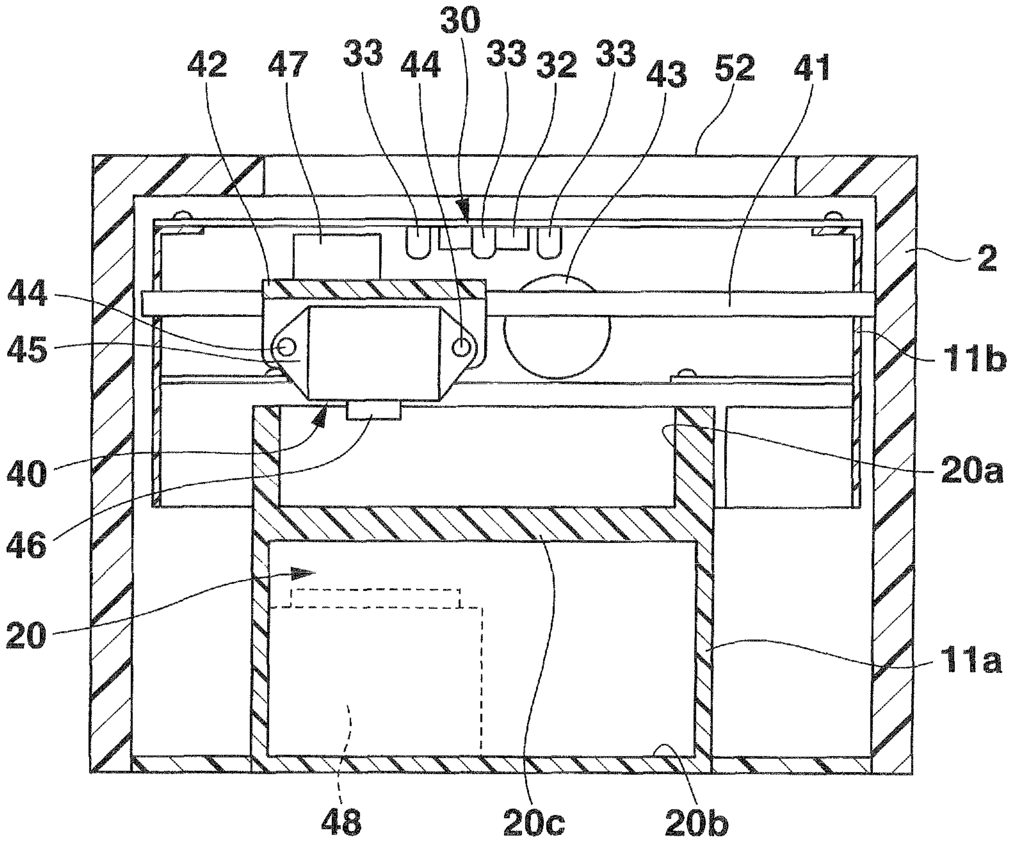
FIG. 6 is a front side cross-sectional view of the nail printer of FIG. 1.
Figure 7:
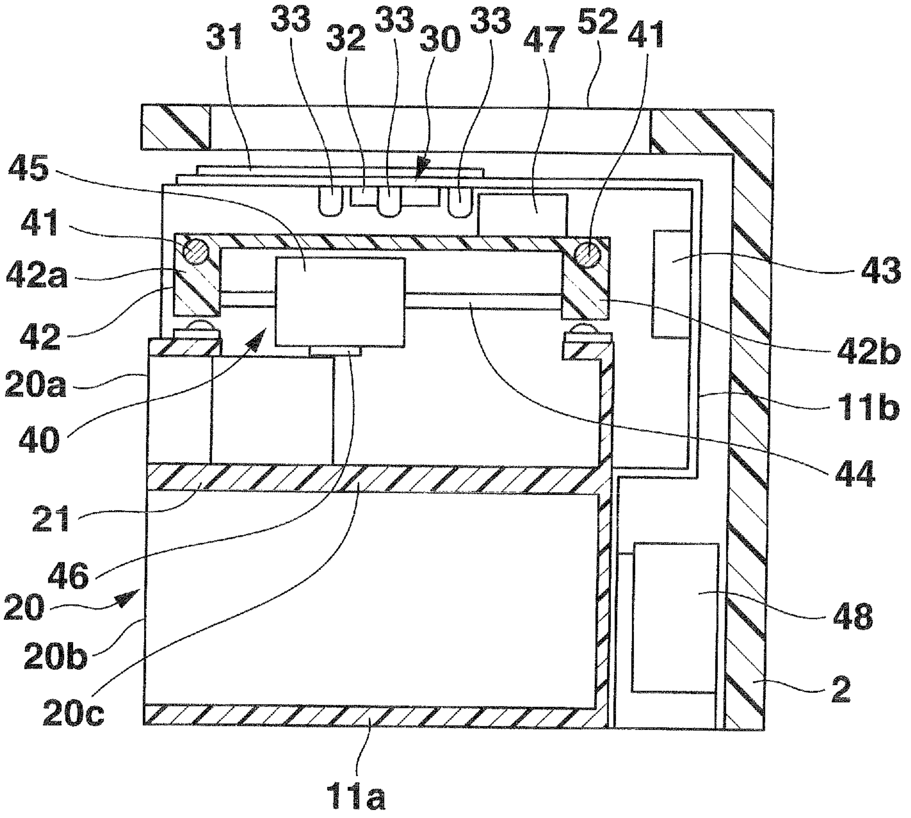
FIG. 7 is a side elevational cross-sectional view of the nail printer.

Referring to FIGS. 6 and 7, the image catcher 30 of the nail printer of this embodiment is provided on the upper subframe

Figure 8:
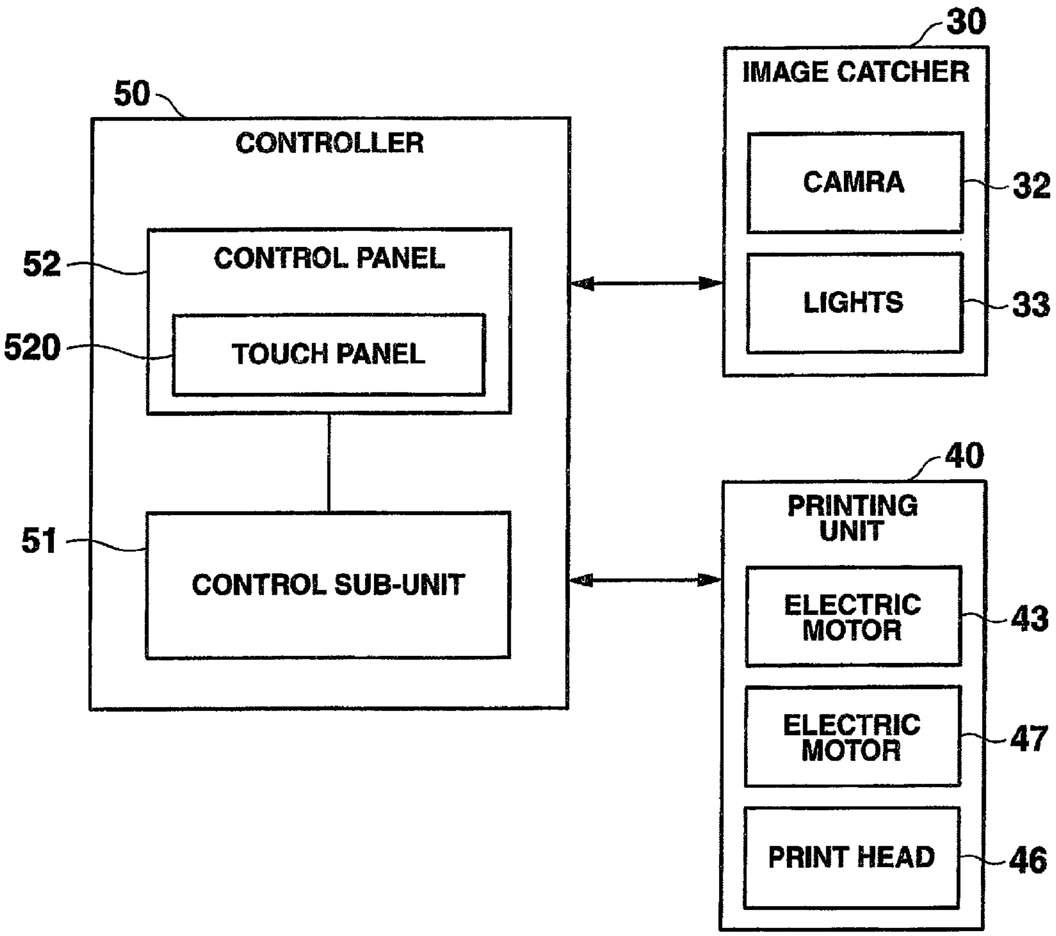
FIG. 8 is a block diagram of a control structure of the nail printer.

11*b*. More specifically, the image catcher 30 is comprised of a camera 32 with 2 million or more pixels including a driver provided at the center of the lower surface of a baseplate 31 attached to the upper sub-frame 11*b*. Four lightings 33 of white LED are disposed on the baseplate 31 so as to surround the camera 32 to illumine the thumb or fingers U1 to catch a better image. The image catcher 30 is comprised of the camera 32 and the four illumination lamps 33. The image catcher 30 is adapted to be controlled by a control sub-unit 51 of a controller 50 (FIG. 8).

Figure 2:
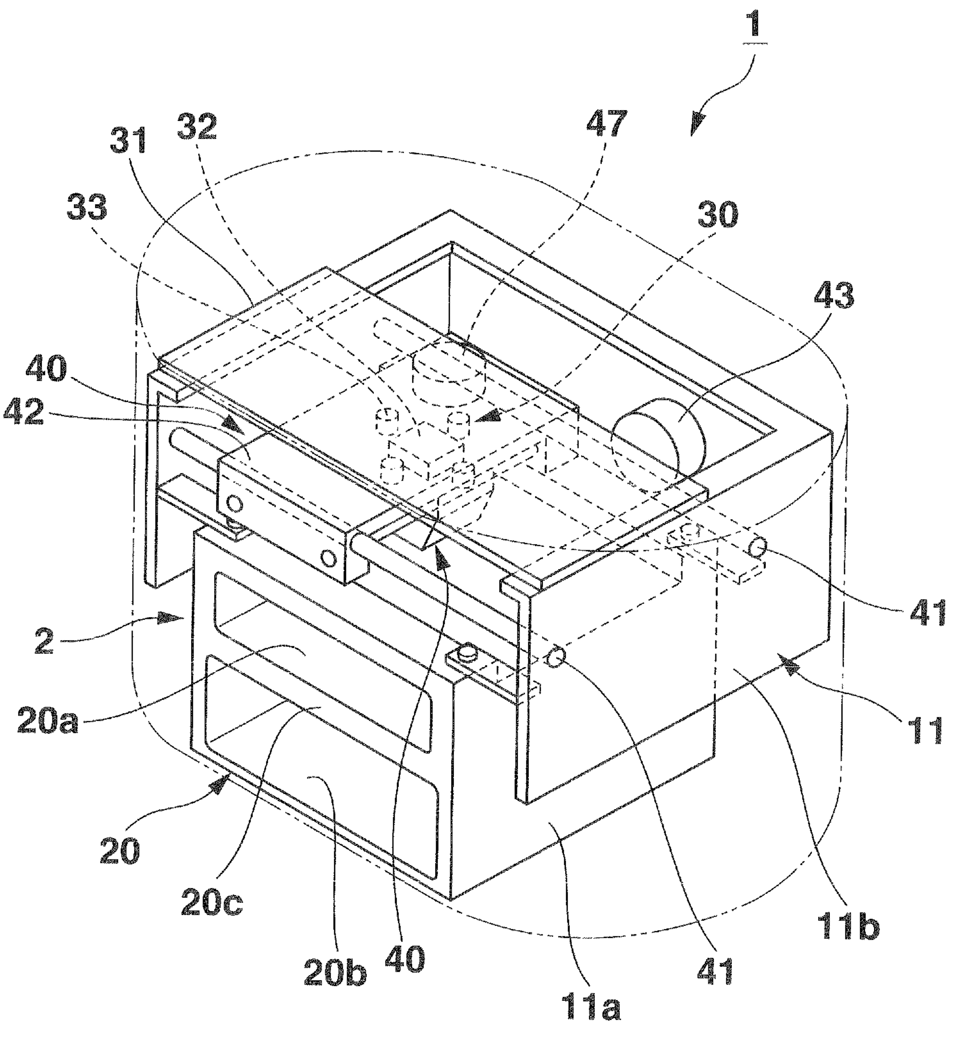
FIG. 2 is a schematic perspective view of the nail printer of FIG. 1 in which its case is shown in a see-through mariner.

A printing unit 40 is mainly provided on the upper sub-frame 11*b*. As shown in FIGS. 2 and 6, the printing unit 40 is comprised of a primary carriage 42 slidable right and left along a pair of parallel guide rods 41 supported by both sides of the upper sub-frame 11*b*, a secondary carriage 45 slidable back and forth along a pair of parallel guide rods 44 supported by the front and rear walls 42*a* and 42*b* of FIG. 7, and a print head 46 attached at the center of the lower surface of the secondary carriage 45. The print head 46 is of an inkjet type which produces droplets from an ink and jets the droplets directly against an object to be printed. The recording system of the print head 46 is not limited to the inkjet type.

The primary carriage 42 is connected to an electric motor 43 through power transmitting means (not shown) such that when the motor 43 is rotated, for example forwardly, the primary carriage 42 is moved, for example rightward, along the pair of guide rods 41 or vise versa. The secondary carriage 45 is connected through power transmitting means (not shown) to a second electric motor 47 such that when the motor 47 is rotated, for example forwardly, the secondary carriage 45 is moved, for example rightward, or vise versa. An ink cartridge 48 is provided on the lower sub-frame 11*a* so as to feed ink to the print head 46 through an ink feed pipe (not shown), as required.

The printing unit 40 is comprised of the guide rods 41, the primary carriage 42, the electric motor 43, the guide rods 44, the secondary carriage 45, the print head 46, the electric motor 47 and the ink cartridge 48.

In the embodiment, the image catcher 30 and the printing unit 40 compose print controlling means.

The controller 50 is provided on the upper sub-frame 11*b*. As shown in FIG. 8, the controller 50 comprises a control sub-unit 51 provided on the base plate 31 and a control panel 52 which includes a liquid crystal touch panel 520 provided at the center of the top 2*f* of the case 2 (FIG. 9).

Figure 9:
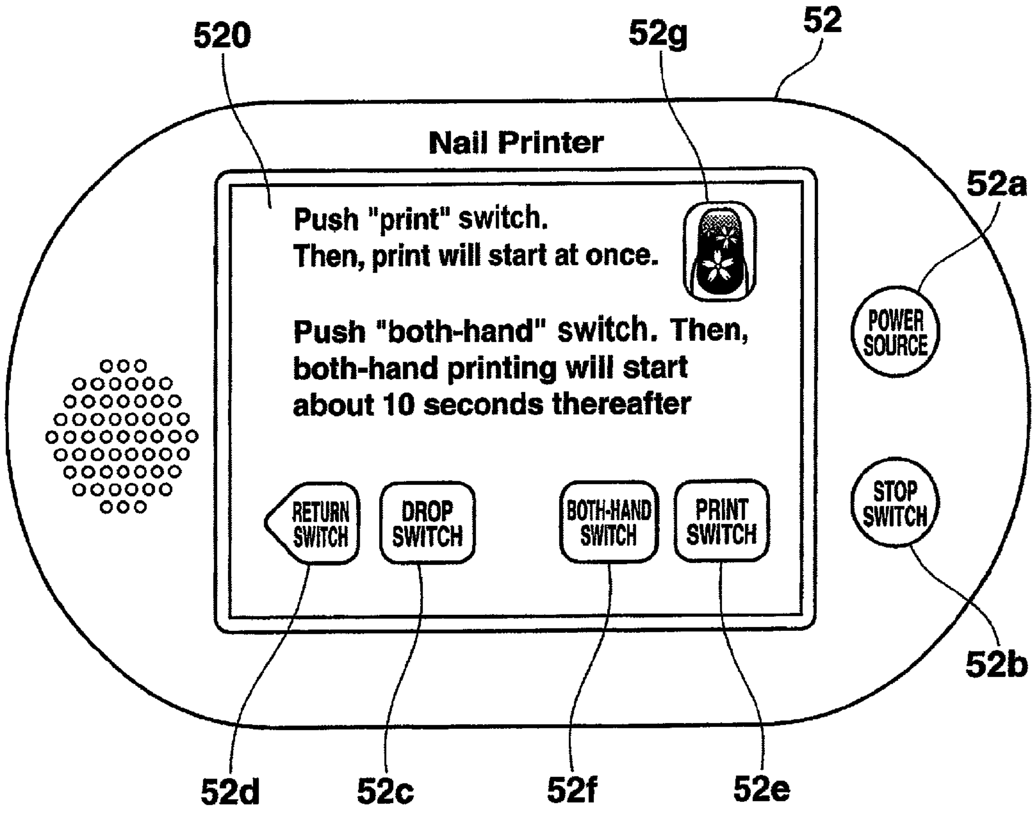
FIG. 9 is a plan view of one example of a control panel of the nail printer.

Referring to FIG. 9, the control panel 52 is illustrated where an initial picture for the printing process is displayed on the liquid crystal touch panel 520. As shown, the control panel 52 includes a power switch 52*a* that turns on a power source for the nail printer 1 and a stop switch 52*b* operated to stop the nail printer 1 completely. The liquid crystal touch panel 520 comprises a both-hand switch 52*f* as first print start commanding means that gives a both-hand fingernail print command, a print switch 52*e* as second print start commanding means that gives a print start command, a drop switch 52*c* that drops the printing operation temporarily, a return switch 52*d* that returns the step to the previous step, and a pattern select switch (not shown) that allows the user to select a nail pattern or design to be printed.

The liquid crystal touch panel 520 is adapted to display a selected thumbnail 52*g* for confirming purposes. If the user desires to select another pattern or design, she operates the return switch 52*d* to return to the nail pattern or design select picture (not shown) and then reselects a favorite nail pattern or design.

The control sub-unit 51 comprises a computer (not shown) which in turn comprises a CPU, a ROM and a RAM. The ROM stores nail patterns or designs to be printed, and programs including a printing program to be executed by the computer.

In the present embodiment, the control sub-unit 51 functions as control means for controlling the printing unit 40 (including the image catcher 30 and the printing unit 40). More specifically, upon receiving a command from the print switch 52*e* as the second print start commanding means, the control sub-unit 51 controls the print controlling means so as to start the printing operation immediately on the respective nails T of the thumbs or fingers. A predetermined time after receiving a command from the both-hand switch 52*f* as the first print start commanding means, the control sub-unit 51 controls the print controlling means so as to start the printing process.

The printing process includes catching an image of the thumbs or fingers U1 and printing on their finger nails by the printing unit 40. More specifically, when the print switch 52*e* and the both-hand switch 52*f* are operated to start the printing operation, the control sub-unit 51 causes the image catcher 30 to catch an image of the thumbs or fingers U1 to obtain their data. Then, the control sub-unit 51 determines the types, positions, sizes and extents of the respective thumbs or fingers inserted in the printed finger receiver 20*a*, and then determines the respective positions and extents of a print on the associated finger nails. Then, the control sub-unit 51 selects a pattern or design to be printed from among the patterns or designs stored in the ROM based on the information received from the pattern select switch 52*g* on the control panel 52 and then outputs corresponding pattern or design data to the printing unit 40. Then, the control sub-unit 51 controls the printing unit 40 to print a corresponding pattern or design on the respective associated finger nails T.

Although not specially limited, the predetermined time from the operation of the both-hand switch 52*f* to the start of the printing operation is, for example about 10 seconds, required for the user to operate the print switch 52*e*, insert his thumbs or fingers U1 and U2, whose nails should be printed and not be printed, into the printed finger receiver 20*a* and non-printed finger receiver 20*b*, respectively, and then hold the hold wall 20*c* with the thumb and fingers. In this embodiment, the control sub-unit 51 has a timer function to count the time elapsed since the both-hand switch 52*f* issues the command. When the predetermined time has elapsed, the control sub-unit 51 controls the image catcher 30 and the printing unit 40 so as to start the printing process.

It may be arranged that, for example, when the end of the predetermined time approaches, a speaker issues a sound message such as "Printing will start in 2 seconds from now." or the liquid touch panel 520 displays a corresponding message. Alternatively, a lamp may light up to inform the user of a timing point of starting the printing process. By such arrangement, the user can be prepared for the printing process, and put and fix his thumbs or fingers at a more preferable position.

Figure 10:
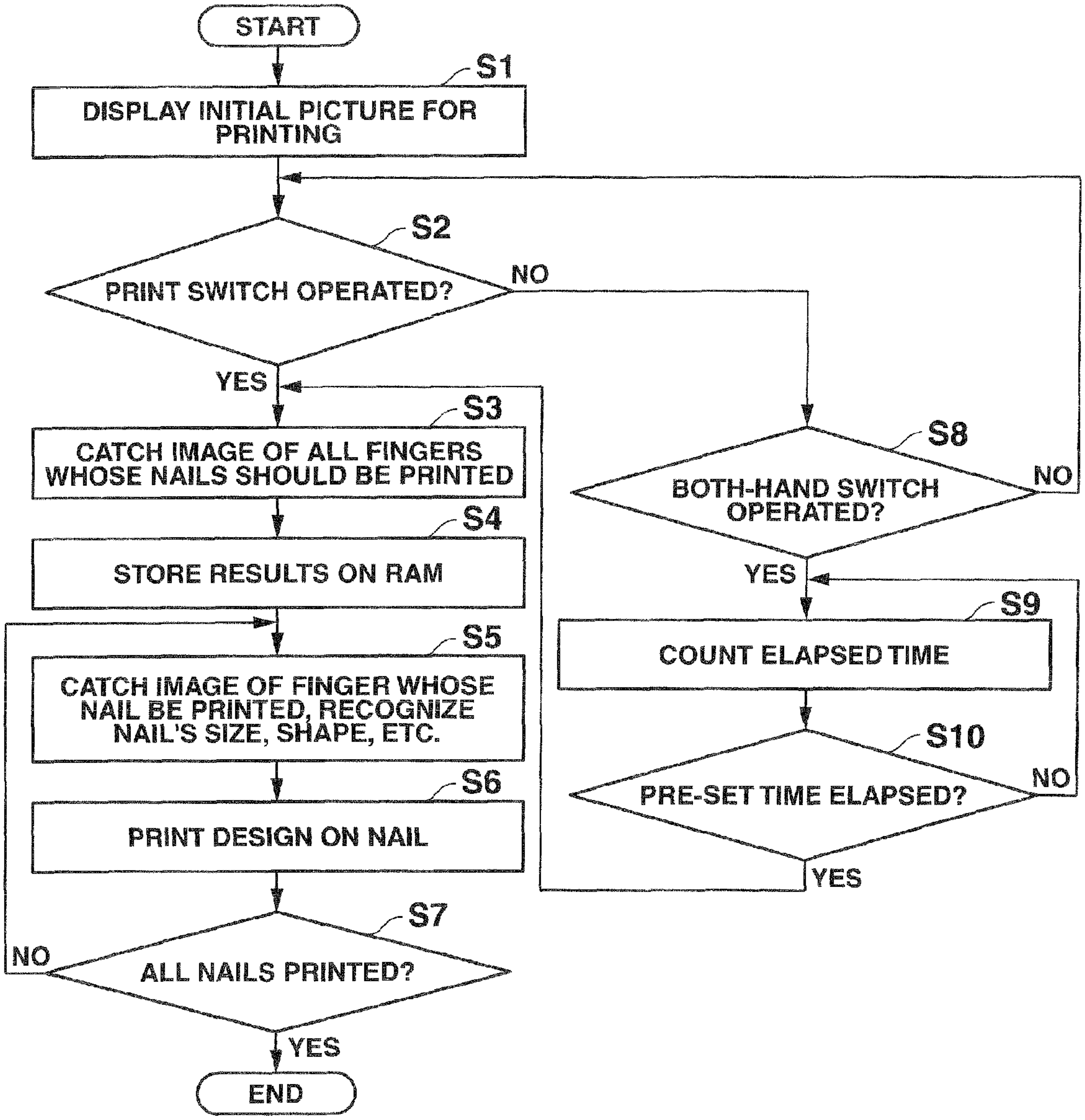
FIG. 10 is a flowchart indicative of a printing process involving one embodiment of the present invention.

Referring to FIG. 10, operation of the nail printer 1 of the embodiment will be described. In the nail printer 1, a pattern or design is printed successively on the respective nails on the fingers or thumbs inserted in the printed finger receiver 20*a*.

In printing, the user first turns on the power source switch 52*a* to start up the control unit 50 and then selects a pattern or design to be printed on the nails of interest. The selected pattern or design is displayed as a thumbnail 52*g* for a confirmation purpose on the liquid crystal touch panel 520. If the displayed pattern or design is satisfactory, the user presses a fix button (not shown) to fix the pattern or design. Then, an initial picture for the printing process such as shown in FIG. 9 is displayed on the touch panel 520 (step S1).

When desiring that a pattern or design be printed on the nail(s) of the thumb or fingers U1 of his one hand and then on those of the thumb or fingers of his other hand, the user first inserts those thumb or fingers U1 and the fingers or thumb U2 of the one hand, whose nails should not be printed, into the printed finger receiver 20*a* and the non-printed finger receiver 20*b*, respectively, the thumb or fingers U1 to the hold wall 20*c* and then operates the print switch 52*e* with his other hand. For example, when wanting to print a pattern or design on the nails T of the first-fourth fingers of his left hand, the user inserts those fingers in an in-plane arrangement into the printed finger receiver 20*a* and the thumb of his left hand into the non-printed finger receiver 20*b*, as shown in FIG. 4. Then, the user holds the hold wall 20*c* with those thumb and fingers to fix them to the hold wall 20*c*. Then, the user operates the print switch 52*e* with his right hand whose thumb or fingers are not inserted into the nail printer 1.

The control sub-unit 51 then determines whether there is a command from the print switch 52*e* on the touch panel 520, or whether there is a touch on the print switch (step S2). If so, the control sub-unit 51 controls the print controlling means so as to start to print the pattern or design immediately on the respective nails T. That is, the image catcher 31 is operated to catch the whole image of his thumb or fingers U1 whose nails should be printed (step S3). Resulting image signals are processed by the controller 50 so as to specify the arrangement and type of the thumb or fingers U1. Then, resulting image data are stored in the RAM (step S4). Then, the image catcher 30 catches an image of a thumb or finger (for example a first finger) U1 whose nail should be printed first. Then, the controller 50 processes a resulting image signal to determine the position and the shape of the nail T of that finger (step S5). Resulting image data are then stored in the RAM. Then, the printing unit 40 is operated to print the selected pattern or design on the nail of the thumb or finger U1 (step S6). Similarly, for the respective remaining fingers or thumb, image catching by the image catcher 30 and printing by the printing unit 40 are repeated.

Then, the control sub-unit 51 determines whether printing on all the nails of the thumb or fingers U1 whose image was caught first has been completed (step S7). Otherwise, control returns to the step S5 to repeat the steps S5-S7. When the printing operation for all the thumb or fingers U1 has been completed (Yes in step S7), the processing ends. In this case, preferably, it is arranged that the user is informed of the completion of the printing operation by a display on the touch panel 520, a sound message from the speaker or lighting up of the lamp.

When the user wants for the two thumbs of both his hands to be printed simultaneously, the user turns on the both-hand switch 52*f* with his one hand. Then, the user inserts both his thumbs U1 into the printed finger receiver 20*a*, and then inserts his fingers U2 of both his hands into the non-printed finger receiver 20*b* within a predetermined time, for example of 10 seconds, after turning on the both-hand switch 52*f*, as shown in FIG. 5. Then, she holds the hold wall 20*c* tightly with those thumbs and fingers.

When there is no command from the print switch 52*e* (step S2, NO), the control sub-unit 51 further determines whether there is a command from the both-hand switch 52*f* (step S8). If not, control returns to the step S2 to repeat the processings concerned. When there is the command from the both-hand switch 52*f* (step S8, YES), the control sub-unit 51 counts the time elapsed since reception of the command from the both-hand switch 52*f* (step S9), and then determines whether the predetermined time has elapsed (step S10). If so (step S10, YES), the control sub-unit 51 controls the print controlling means (including the image catcher 30 and the printing unit 40) so as to start the printing process on the respective nails T. The operation of the image catcher 30 and the printing unit 40 are similar to the steps S3-S7 and further description thereof will be omitted.

The nail printer 1 of this embodiment provides the following advantages: When the both-hand switch 52*f* is operated, the printing process starts a predetermined time, for example of about 10 seconds, after the both-hand switch 52*f* is operated. Thus, when the nails T of the two thumbs or two groups of fingers of both the user's right and left hands should be printed, the user can fix both his thumbs or two group of fingers, whose nails should be printed in a state where the two thumbs or two groups of fingers are put in order, in position with sufficient time within the printed finger receiver after she operates the both-hand switch 52*f* manually and then print on the nails T of those thumbs or two group of fingers easily and securely. Thus, all the nails of the thumbs and fingers of the users right and left hands can be printed in three printing operations: i.e., for example, first, the nails of the first-fourth fingers of the right hand are printed; second, the nails of the first-fourth fingers of the left hand are printed; and, third, the nails of the both thumbs of the right and left hands are printed.

The print controlling means includes the image catcher 30 and the printing unit 40. Therefore, a pattern or design can be printed at an appropriate position on the nail(s) of the thumb or fingers of right and/left hand(s), by discriminating the types, sizes, positions and extents of the respective thumb(s) or fingers correctly.

Second Embodiment

The second embodiment of the nail printer according to the present invention will be described. The second embodiment is different in printing process from the first embodiment and its different points will be mainly described. The nail printer of this second embodiment has a substantially similar structure to the first embodiment.

In the second embodiment, the control sub-unit 51 functions as control means for controlling the printing unit 40 and other devices concerned as in the first embodiment. More specifically, when receiving a command from the print switch 52*e* alone as the second print start commanding means, the control sub-unit 51 controls the print controlling means (including the image catcher 30 and the printing unit 40) so as to start to print on the respective nails T immediately. On the other hand, when receiving a command from the both-hand switch 52*f* as the first print start commanding means and then a command from the print switch 52*e* as the second print start commanding means, the control sub-unit 51 controls the print controlling means so as to start the printing process a predetermined time after receiving the command from the print switch 52*e*. Other structures of this embodiment are similar to those of the first embodiment and further description thereof will be omitted.

Figure 11:
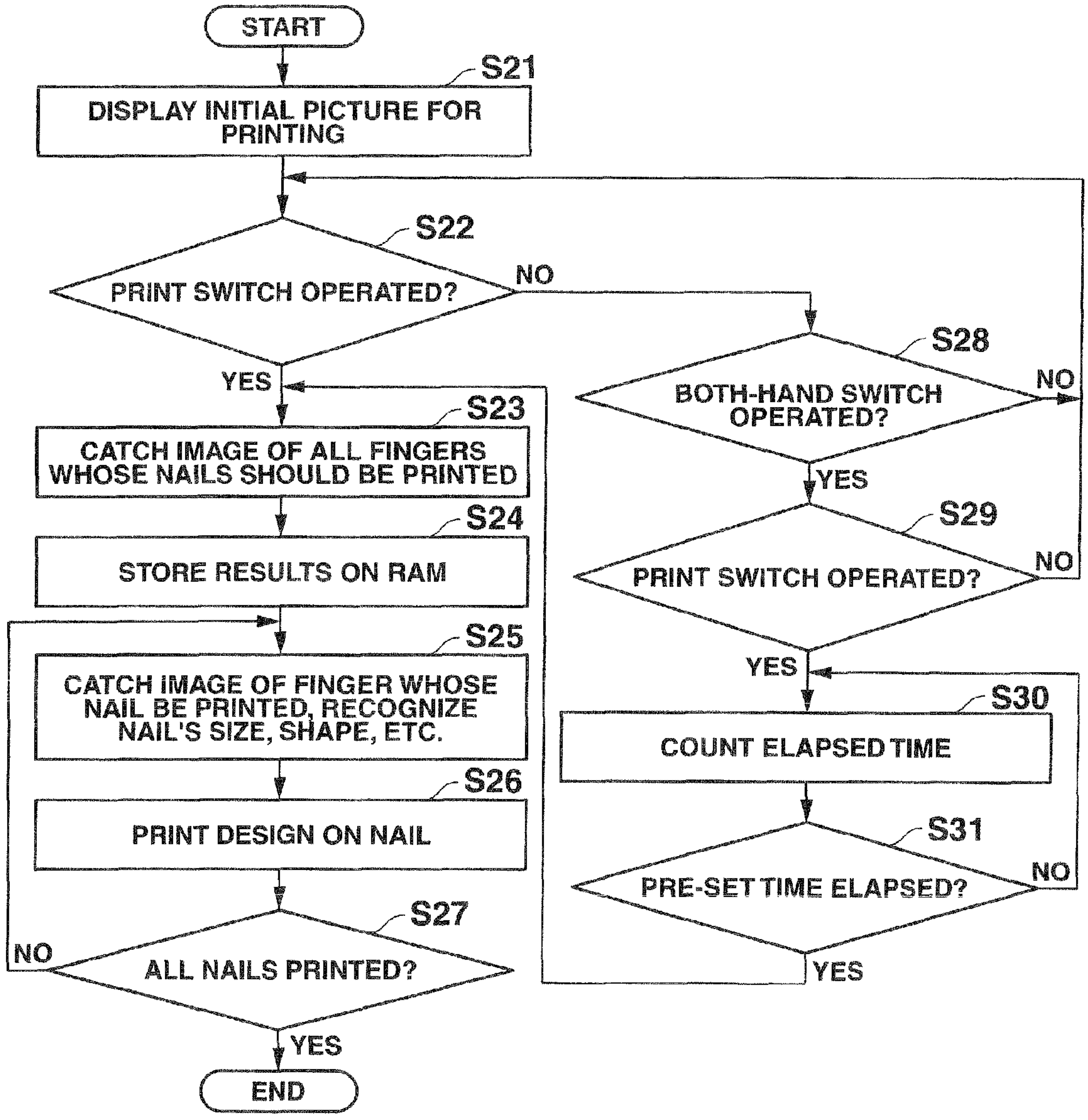
FIG. 11 is a flowchart indicative of a printing process involving a second embodiment.

Next, referring to FIG. 11, operation of the nail printer 1 of this embodiment will be described. In printing, the user first turns on the power source switch 52*a* to start up the control unit 50 and then selects a favorite pattern or design to be printed on the nails of interest. The selected pattern or design is displayed as a thumbnail 52*g* for a confirmation purpose on the liquid crystal touch panel 520. If the displayed pattern or design is satisfactory, the user presses a fix button (not shown) to fix the pattern or design. Then, an initial picture for the printing process such as shown in FIG. 9 is displayed on the touch panel 520 (step S21).

When desiring that a pattern or design be printed on the nail(s) of the thumb or fingers U1 of her one hand and then on those of the thumb or fingers of her other hand, the user inserts her thumb or fingers U1 and her fingers or thumb U2, whose nails should not be printed, into the printed finger receiver 20*a* and the non-printed finger receiver 20*b*, respectively, fixes the thumb or fingers U1 to the hold wall 20*c* and then operates the print switch 52*e* with her other hand. For example, when she wants to print a pattern or design on the nails T of the first-fourth fingers of her left hand, she inserts the fingers in an in-plane arrangement into the printed finger receiver 20*a* and the thumb of that hand into the non-printed finger receiver 20*b*, as shown in FIG. 4. Then, the user holds the hold wall 20*c* with the thumb and fingers of that hand to fix them to the hold wall 20*c*. Then, the user operates the print switch 52*e* with her right hand.

The control sub-unit 51 then determines whether there is a command from the print switch 52*e* on the touch panel 520 or whether there is a touch on the print switch 52*e* (step S22). If so, the control sub-unit 51 controls the print controlling means so as to start to print the pattern or design immediately on the respective nails T. That is, the image catcher 31 is operated to catch a whole image of her thumb or fingers U1 whose nails should be printed (step S23). A resulting image signal is processed by the controller 50 so as to specify the arrangement and type of the thumb or fingers U1. Resulting image data is stored in the RAM (step S24). Then, the image catcher 30 catches an image of a thumb or finger (for example a first finger) U1 whose nail should be printed first. Then, the controller 50 processes a resulting image signal to determine the position and shape of the nail T of that finger (step S25). Resulting image data is then stored in the RAM. Then, the printing unit 40 is operated to print the selected pattern or design on the nail of the thumb or finger U1 (step S26). Similarly, for the respective remaining fingers or thumb, image catching by the image catcher 30 and printing by the printing unit 40 are repeated.

Then, the control sub-unit 51 determines whether printing on all the nails of the thumb or fingers whose whole image was caught first has been completed (step S27). Otherwise, control returns to the step S5 to repeat the steps S5-S7. When the printing operation for all those thumb or fingers has been completed (Yes in step S27), the processing ends. In this case, preferably, it is arranged that the user is informed of the completion of the printing operation by a display on the touch panel 520, a sound message from the speaker or lighting up of the lamp.

When wanting for both the nails of her thumbs to be printed simultaneously, the user turns on the both-hand switch 52*f* and then the print switch 52*e*. Then, the user inserts both her thumbs U1, whose nails should be printed, into the printed finger receiver 20*a*, and then inserts her fingers of both her hands U2, whose nails should not be printed, into the non-printed finger receiver 20*b* within a predetermined time, for example of 10 seconds, after turning on the both-hand switch 52*f*, as shown in FIG. 5. Then, she holds the hold wall 20*c* tightly with her thumbs and fingers.

When there is no command from the print switch 52*e* (step S22, NO), the control sub-unit 51 further determines whether there is a command from the both-hand switch 52*f* (step S28). If not, control returns to step S22 to repeat the processings concerned. When there is the command from the both-hand switch 52*f* (step S28, YES), the control sub-unit 51 further determines whether there is the command from the print switch 52*e* (step S29). If not, control returns to the step S2 to repeat the processings concerned. When receiving the command from the print switch 52*e* following the operation of the both-hand switch 52*f* (step S29, YES), the control sub-unit 51 counts the time elapsed since reception of the command from the print witch 52*e* (step S30), and always determines whether the predetermined time has elapsed (step S31). If so (step S31, YES), the control sub-unit 51 controls the print controlling means (including the image catcher 30 and the printing unit 40) so as to start the printing process on the respective nails T.

The nail printer 1 of this embodiment provides the following advantages: When the both-hand switch 52*f* and then the print switch 52*e* are operated, the printing process starts a predetermined time, for example of about 10 seconds, after the print switch 52*e* is operated. Thus, when the nails T of the two thumbs or two groups of fingers of both the user's right and left hands should be printed, the user can fix both her thumbs or two group of fingers in position with sufficient time within the printed finger receiver after she operates the print switch 52*e* manually and then print on the nails T of the thumbs or two groups of fingers U1 easily and securely. Thus, all the nails of the thumbs and fingers of the user's right and left hands can be printed in three printing operations: i.e., for example, first, the nails of the first-fourth fingers of the right hand are printed; second, the nails of the first-fourth fingers of the left hand are; and, third, the nails of the both thumbs of the right and left hands are. The print controlling means includes the image catcher 30 and the printing unit 40. Therefore, a pattern or design can be printed at an appropriate position on the nail(s) of the thumb(s) or fingers of right and/or left hand(s), by discriminating the types, sizes, positions and extents of the respective thumbs or fingers correctly.

Third Embodiment

Then, the third embodiment of the nail printer according to the present invention will be described. In the embodiment, the control panel is different in structure from those of the first and second embodiments. In the following, their different points will be described. The nail printer of this embodiment has a similar structure to those of the first and second embodiments.

Figure 12:
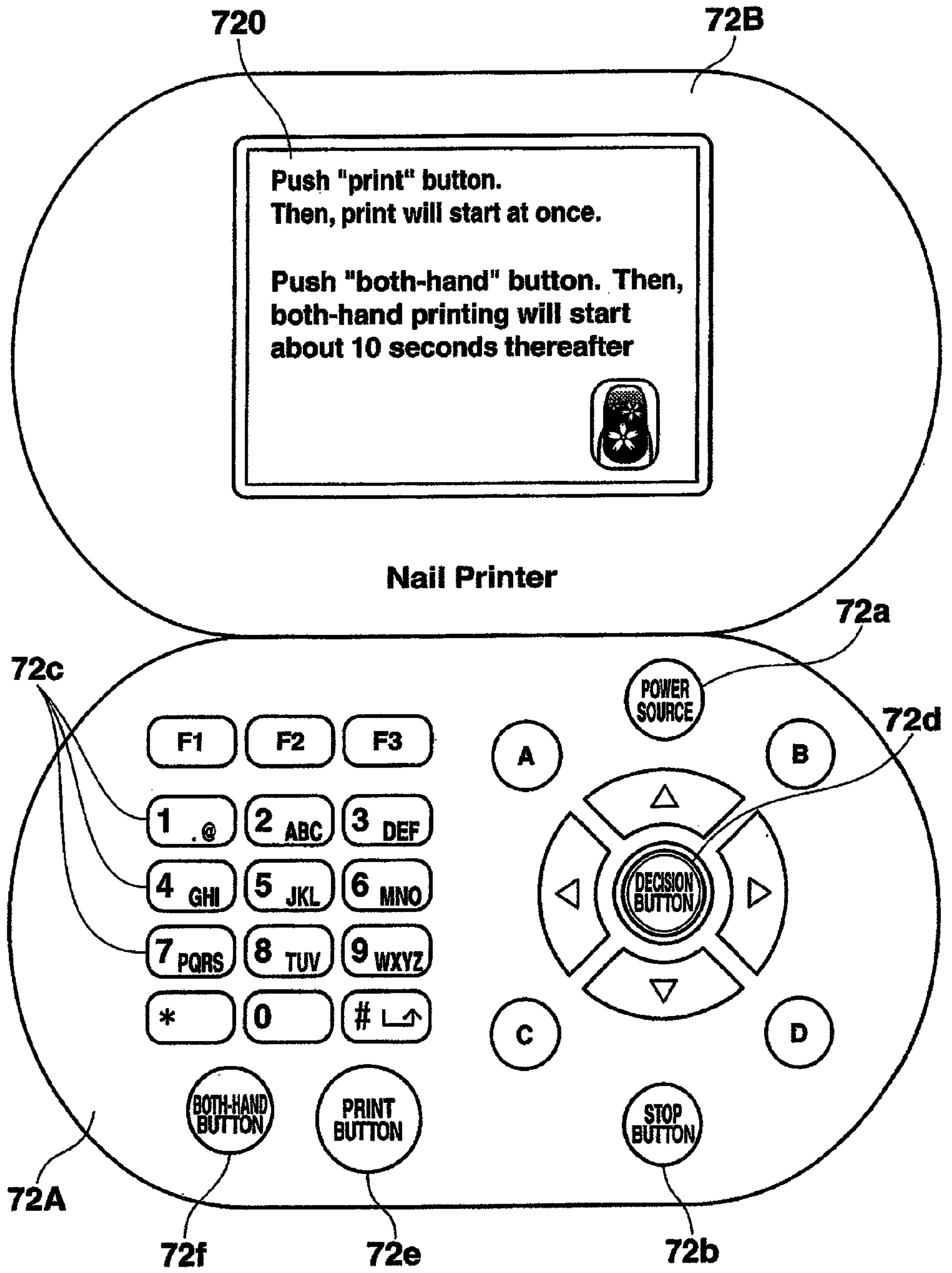
FIG. 12 is a plan view of one example of a control panel of a nail printer as a third embodiment.

FIG. 12 is a plan view of a control panel 72 of the nail printer of the present embodiment. The control panel includes a top-side control sub-panel 72A provided on a top of the case and a cover-side control sub-panel 72B provided on the back of the top cover.

FIG. 12 is a plan view of a control panel 72 of the nail printer of the present embodiment. The control panel includes a top-side control sub-panel 72A provided on a top of the case and a cover-side control sub-panel 72B provided on the back of the top cover. The top-side control sub-panel 72A has a power source button 72*a* that turns on the power source of the nail printer 1, and a stop button 72*b* that stops the nail printer, a plurality of numerical buttons 72*c*, a decision button 72*d*, a print button 72*e*, a both-hand button 72*f* and others.

The cover-side control sub-panel 72B comprises a liquid crystal touch panel 720, which will show various switches including a pattern select switch (not shown) by which the user can select a favorite nail pattern or design to be printed on her nails.

In the present embodiment, the control sub-unit 51 functions as control means for controlling the printing unit 40, as in the first and second embodiments. More specifically, upon receiving a command from the print button 72*e* as the second print start commanding means, the control sub-unit 51 controls the print controlling means (including the image catcher 30 and the printing unit 40) so as to start the printing operation immediately on the respective nails T of the thumbs or fingers of interest. A predetermined time after receiving a command from the both-hand button 72*f* as the first print start commanding means, the control sub-unit 51 controls the print controlling means so as to start the printing process. Other structures of the third embodiment are similar to corresponding ones of the first and second embodiments and further description thereof will be omitted.

Figure 13:
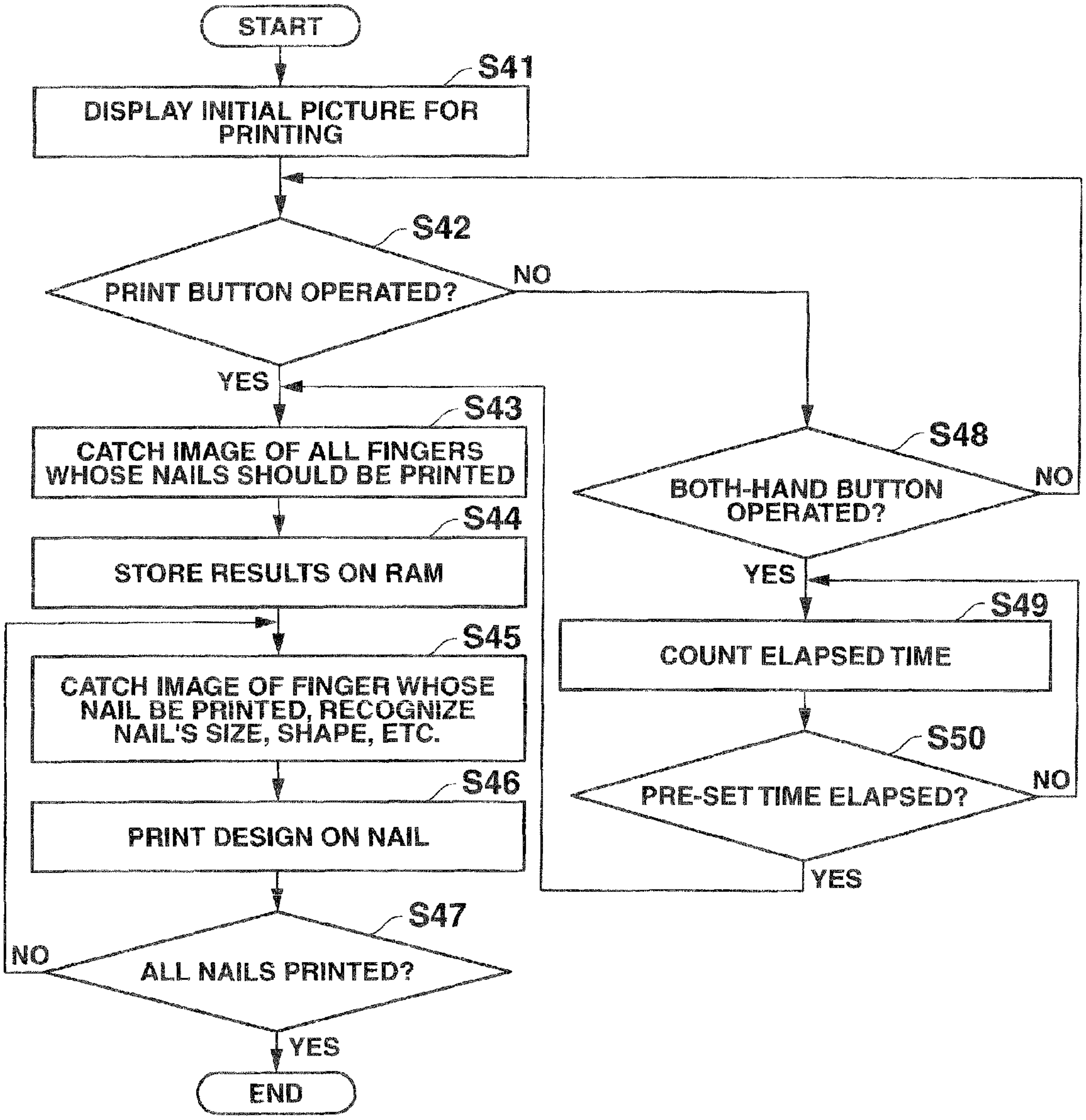
FIG. 13 is a flowchart indicative of a printing process involving the third embodiment.

Then, referring to FIG. 13, operation of the nail printer of the present invention will be described. In printing, the user first turns on the power source button 72*a* of the printer 1 to start up the control unit 50 and then selects and fixes a pattern or design to be printed on the nails of interest. Then, an initial print picture is displayed on the liquid crystal touch panel 720, as shown in FIG. 12 (step S41).

When desiring that a pattern or design be printed on the nail(s) of the thumb or fingers U1 of her one hand and then on those of the thumb or fingers of her other hand, the user inserts the thumb or fingers U1 of the one hand and the fingers or thumb U2 of that hand, whose nails should not be printed, into the printed finger receiver 20*a* and the non-printed finger receiver 20*b*, respectively, fixes the thumb or fingers U1 to the hold wall 20*c* and then operates the print switch 52*e* with her other hand. For example, when wanting to print a pattern or design on the nails T of the first-fourth fingers of her left hand, the user inserts those fingers in an in-plane arrangement into the printed finger receiver 20*a* and the thumb of her left hand into the non-printed finger receiver 20*b*, as shown in FIG. 4, Then, the user holds the hold wall 20*c* with her thumb and fingers inserted into the printed finger receiver 20*a* to fix them to the hold wall 20*c*. Then, the user operates the print button 72*e* with her right hand whose thumb or fingers are not inserted into the nail printer 1.

The control sub-unit 51 then determines whether there is a command from the print button 72*e* on the top-side control sub-panel 72A or whether there is a push on the print button 72*e* (step S42). If so, the control sub-unit 51 controls the print controlling means so as to start to print the pattern or design immediately on the respective nails T. The processings in steps S43-S47 are similar to the steps S3-S7 in the first embodiment and further description thereof will be omitted.

When wanting for both her thumbs to be printed simultaneously, the user turns on the both-hand button 72*f* with her one hand. Then, the user inserts both her thumbs U1, whose nails should be printed, into the printed finger receiver 20*a*, and then inserts the fingers U2 of both her hands, whose nails should not be printed, into the non-printed finger receiver 20*b* within a predetermined time, for example of 10 seconds, after turning on the both-hand button. 72*f*. Then, she holds the hold wall 20*c* tightly with her thumbs and fingers, thereby securing her thumbs UT to the hold wall 20*c*.

When there is no command from the print button 72*e* (step S42, NO), the control sub-unit 51 further determines whether there is a command from the both-hand button 72*f* (step S48). If not, control returns to the step S42 to repeat the processings concerned. When there is the command from the both-hand button 72*f* (step S48, YES), the control sub-unit 51 counts the time elapsed since reception of the command from the both-hand button 72*f* (step S49), and then determines whether the predetermined time has elapsed (step S50). If so (step 350, YES), the control sub-unit 51 controls the print controlling means including the image catcher 30 and the printing unit 40 so as to start the printing process on the respective nails in accordance with the steps S43-S47 whose further description thereof will be omitted.

The nail printer 1 of this embodiment provides the following advantages: When the both-hand button 72*f* is operated, the printing process starts a predetermined time, for example of about 10 seconds, after the both-hand button 72*f* is operated. Thus, when the nails T of the two thumbs or two groups of fingers of both the user's right and left hands should be printed, the user can fix both her thumbs or two group of fingers in position with sufficient time within the printed finger receiver after she operates the both-hand button 72*f* manually and then print on the nails T of both her thumbs or two group of fingers easily and securely. Thus, all the nails of the thumbs and fingers of the user's right and left hands can be printed in three printing operations: i.e., for example, first, the nails of the first-fourth fingers of the right hand are printed; second, the nails of the first-fourth fingers of the left hand are; and, third, the nails of the both thumbs of the right and left hands are. The print controlling means includes the image catcher 30 and the printing unit 40. Therefore, a pattern or design can be printed at an appropriate position on the nail(s) of the thumb or fingers of the user's right and/or left hand(s), by discriminating the types, sizes, positions and extents of the respective thumb(s) or fingers correctly.

Fourth Embodiment

The fourth embodiment of the nail printer according to the present invention will be described. The present embodiment is different in control panel from the first-third embodiments and its different points will be mainly described.

The nail printer of this fourth embodiment has a substantially similar structure to the first-third embodiments, and also has a control panel 72 similar to that of the third embodiment. The nail printer of this fourth embodiment has a substantially similar structure to those of the first-third embodiments.

In the fourth embodiment, the control sub-unit 51 functions as control means for controlling the printing unit 40 and other devices concerned as in the first-third embodiments. More specifically, when receiving a command from the print button 72*e* alone as the second print start commanding means, the control sub-unit 51 controls the print controlling means (including the image catcher 30 and the printing unit 40) so as to start to print on the respective nails T immediately. On the other hand, when receiving a command from the both-hand button 72*f* as the first print start commanding means and then a command from the print button 72*e* as the second print start commanding means, the control sub-unit 51 controls the print controlling means so as to start the printing process a predetermined time after receiving the command from the print button 72*e*. Other structures are similar to those of the first-third embodiments and further description thereof will be omitted.

Figure 14:
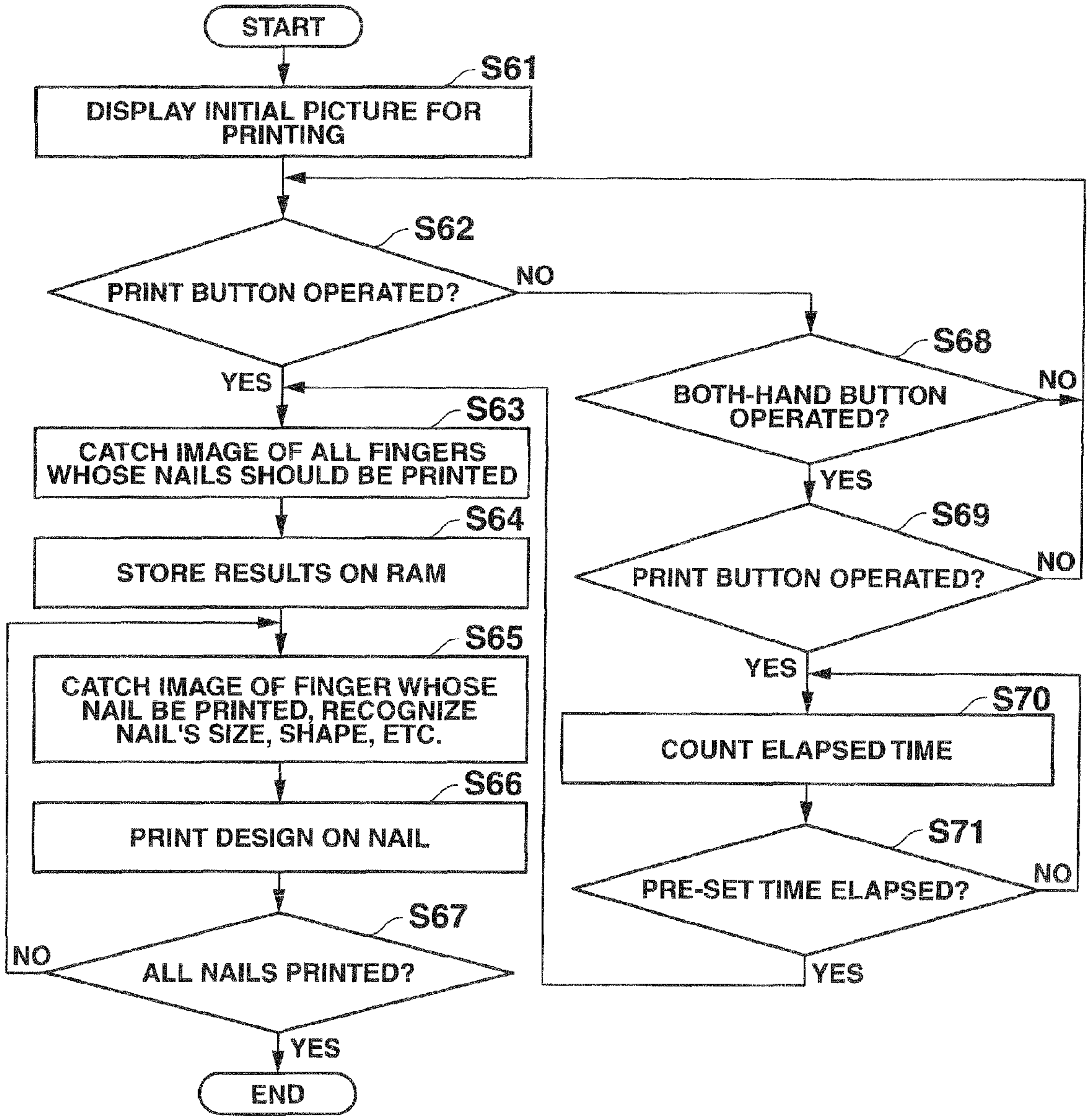
FIG. 14 is a flowchart indicative of a printing process involving a fourth embodiment.

Next, referring to FIG. 14, operation of the nail printer 1 of this embodiment will be described. In printing, the user first turns on the power source button 72*a* to start up the control unit 50 and then selects and fixes a nail pattern or design to be printed on a nail of interest. Then, an initial picture for the printing process is displayed on the touch panel 720 (step S61).

When desiring that a pattern or design be printed on the nail(s) of the thumb or fingers U1 of her one hand and then on those of the thumb or fingers of her other hand, the user inserts the thumb or fingers U1 and her fingers or thumb U2 of that hand, whose nails should not be printed, into the printed finger receiver 20*a* and the non-printed finger receiver 20*b*, respectively, fixes the thumb or fingers U1 and the fingers or thumb U2 to the hold wall 20*c* and then operates the print button 72*e* with her other hand. For example, when wanting to print a pattern or design on the nails T of the first-fourth fingers of her left hand, she inserts those fingers in an in-plane arrangement into the printed finger receiver 20*a* and her thumb of that hand into the non-printed finger receiver 20*b*. Then, the user holds the hold wall 20*c* with her thumb and fingers of that hand to fix them to the hold wall 20*c*. Then, the user operates the print button 72*e* with her right hand whose thumb or fingers are not inserted into the nail printer 1.

The control sub-unit 51 then determines whether there is a command from the print button 72*e* or whether there is a touch on the print button 72*e* (step S62). If so, the control sub-unit 51 controls the print controlling means so as to start to print the pattern or design immediately on the respective nails T. The processings in the steps S63-S67 are similar to the steps S23-S27 of the second embodiment, and further description thereof will be omitted.

When wanting for both her thumbs to be printed simultaneously, the user turns on the both-hand button 72*f* and then the print button 72*e*. Then, the user inserts both her thumbs U1, whose nails should be printed, into the printed finger receiver 20*a*, and inserts the pair of fingers U2 of both her hands, whose nails should not be printed, into the non-printed finger receiver 20*b* within a predetermined time, for example of 10 seconds, after turning on the both-hand button 72*f*. Then, she holds the hold wall 20*c* tightly with her thumbs and fingers, thereby fixing her thumbs U1 to the hold wall 20*c*.

When there is no command from the print button 72*e* (step S62, NO), the control sub-unit 51 further determines whether there is a command from the both-hand button 72*f* (step S68). If not, control returns to step S62 to repeat the processings concerned. When there is the command from the both-hand button 72*f* (step S68, YES), the control sub-unit 51 further determines whether there is the command from the print button 72*e* (step S69). If not, control returns to the step S62 to repeat the processings concerned. When receiving the command from the print button 72*e* following the operation of the both-hand button 72*f* (step S69, YES), the control sub-unit 51 counts the time elapsed since reception of the command from the print button 72*e* (step S70), and then determines whether the predetermined time has elapsed (step S71).

If so (step S71, YES), the control sub-unit 51 controls the print controlling means (including the image catcher 30 and the printing unit 40) so as to start the printing process on the respective nails. The steps S63-S67 of the present embodiment are similar to the steps S43-S47 of the third embodiment, and their further description will be omitted.

The nail printer 1 of this embodiment provides the following advantages: When the both-hand button 72*f* and then the print button 72*e* are operated, the printing process starts a predetermined time, for example of about 10 seconds, after the print button 72*e* is operated. Thus, when the nails T of the two thumbs or two groups of fingers of both the user's right and left hands should be printed, the user can fix both her thumbs or two group of fingers U1, whose nails should be printed, in position with sufficient time within the printed finger receiver after she operates the print button 72*e* manually, and then print on the nails T easily and securely. Thus, all the nails of the thumbs and fingers of the user's right and left hands can be printed in three printing operations: i.e., for example, first, the nails of the first-fourth fingers of the right hand are printed; second, the nails of the first-fourth fingers of the left hand are, and, third, the nails of the both thumbs of the right and left hands are.

The print controlling means includes the image catcher 30 and the printing unit 40. Therefore, a pattern or design can be printed at an appropriate position on the nail(s) of the thumb or fingers of right and/or left hand(s), by discriminating the types, sizes, positions and extents of the respective thumbs or fingers correctly.

SUMMARY OF THE CORRESPONDENCE BETWEEN THE CLAIMED INVENTIONS AND THE DESCRIBED EMBODIMENTS

A nail printer (1, FIG. 1, . . . ) according to a first aspect of the present invention comprises: a printed finger receiver (20*a*, FIG. 1, . . . ) into which fingers (U1) of both right and left hands whose nails should be printed with an image are inserted; print controlling means (30, 40, FIG. 8, . . . ) for printing the image on the respective nails of the fingers of the both right and left hands; an operation member (52*e*, 52*f*, FIG. 9, . . . ; 72*e*, 72*f*, FIG. 12) operable for giving a print start command; and control means (51, FIG. 8) for controlling the print controlling means so as to start to print the image on the nails a predetermined time after the print start command is given by the operation member.

A nail printer (1, FIG. 1, . . . ) according to a second aspect of the present invention comprises: a printed finger receiver (20*a*, FIG. 1, . . . ) into which fingers (U1) of both right and left hands whose nails should be printed with an image are inserted; print controlling means (30, 40, FIG. 8, . . . ) for printing the image on the respective nails of the fingers of the both right and left hands inserted in the printed finger receiver; first print start commanding means (52*f*, FIG. 9, . . . ; 72*f*, FIG. 12) operable for giving a command to print the image successively on the respective nails of the fingers of the both right and left hands inserted in the printed finger receiver; second print start commanding means (52*e*, FIG. 9, . . . ; 72*e*, FIG. 12) operable for giving a print start command to print the image on a nail of at least one of fingers of one of the both right and left hands inserted into the printed finger receiver; and control means (51, FIG. 8) responsive to the print start command given by the first printing start commanding means for controlling the print controlling means so as to start to print the image immediately and successively on the respective nails of the fingers of the both right and left hands a predetermined time thereafter and responsive to the print start command given by the second print start commanding means for controlling the print controlling means so as to start to print the image immediately on the nail of the at least one of the fingers of the one hand.

A nail printer according to a third aspect of the present invention comprises: a printed finger receiver (20*a*, FIG. 1, . . . ) into which fingers (U1) of both right and left hands whose nails should be printed with an image are inserted; print controlling means (30, 40, FIG. 8, . . . ) for printing the image on the respective nails of the two thumbs or two groups of fingers inserted in the printed finger receiver; first print start commanding means (52*f*, FIG. 9, . . . ; 72*f*, FIG. 12) operable for giving a command to print the image successively on the nails of the fingers of the both right and left hands inserted in the printed finger receiver; second print start commanding means (52*e*, FIG. 9, . . . ; 72*e*, FIG. 12) operable for giving a print start command to print the image on a nail (T) of at least one of fingers of one of the both right and left hands inserted into the printed finger receiver; and control means (51, FIG. 8) responsive to the print start command given by the first printing start commanding means and then the print start command given by the second print start commanding means for controlling the print controlling means so as to start to print the image on the respective nails of the fingers of the both right and left hands a predetermined time after the second print start commanding means gives the command and responsive to the print start command given only by the second print start commanding means for controlling the print controlling means so as to start to print the image immediately on the nail of the at least one of the fingers of the one hand.

In the nail printer according to the first aspect of the present invention, the print controlling means (30, 40, FIG. 8, . . . ) may comprise: an image catcher (30, FIG. 8, . . . ) for catching an image of the nails (T) of the finger(s) (U1); and printing means (40, FIG. 8, . . . ) for printing the first-mentioned image successively on the respective nails of the fingers whose image is caught by the image catcher. The nail printer according to the second aspect of the present invention may further comprise switching means (52*f*, FIG. 9, . . . ; 72*f*, FIG. 12) for changing, to a desired length of time, a length of the predetermined period of time from when the print start command is given by the first print start commanding means (52*f*, FIG. 9, . . . ; 72*f*, FIG. 12) or the second print start commanding means (52*e*, FIG. 9, . . . ; 72*e*, FIG. 12) to when the print controlling means (30, 40, FIG. 8, . . . ) starts to print the image.

A fourth aspect of the present invention is a print control method for use in a nail printer which comprises a printed finger receiver (20*a*, FIG. 1, . . . ) into which fingers (U1) of both right and left hands whose nails (T) should be printed with an image are inserted; print controlling means (30, 40, FIG. 8, . . . ) for printing the image on the nails of the fingers; and an operation member (52*e*, 52*f*, FIG. 9, . . . ; 72*e*, 72*f*, FIG. 12) operable for giving a print start command. The method comprises controlling the print controlling means so as to start to print the image on the respective nails of the both right and left hands a predetermined time after the print start command is given by the operation member.

A fifth aspect of the present invention is a print control method for use in a nail printer which comprises a printed finger receiver (20*a*, FIG. 1, . . . ) into which fingers (U1) of both right and left hands whose nails (T) should be printed with an image are inserted; print controlling means (30, 40, FIG. 8, . . . ) for printing the image on the respective nails of the fingers of the both right and left hands inserted in the printed finger receiver; first print start commanding means (52*f*, FIG. 9, . . . ; 72*f*, FIG. 12) operable for giving a command to print the image successively on the respective nails of the fingers of the both right and left hands inserted in the printed finger receiver; and second print start commanding means (52*e*, FIG. 9, . . . ; 72*e*, FIG. 12) operable for giving a print start command to print the image on a nail of at least one of fingers of one of the both hands inserted into the printed finger receiver. The method comprises, responsive to the print start command given by the first print start commanding means, controlling the print controlling means so as to start to print the image immediately on the respective nails a predetermined time thereafter and, responsive to the print start command given by the second print start commanding means, controlling the print controlling means so as to start to print the image immediately on the nail of the at least one of the fingers of one of the one hand (51, FIG. 8).

A sixth aspect of the present invention is a print control method for use in a nail printer comprising a printed finger receiver (20*a*, FIG. 1, . . . ) into which fingers of both right and left hands whose nails (T) should be printed with an image are inserted; print controlling means (30, 40, FIG. 8, . . . ) for printing the image on the respective nails (T) of the fingers of the both right and left hands inserted into the printed finger receiver; first print start commanding means (52*f*. FIG. 9; 72*f*, FIG. 12) operable for giving a command to print the image successively on the nails of the fingers of the both right and left hands inserted into the printed finger receiver; and second print start commanding means (52*e*. FIG. 9; 72*e*, FIG. 12) operable for giving a print start command to print the image on a nail of at least one of fingers of one of the both right and left hands. The method comprises, responsive to the print start command given by the first print start commanding means and then the print start command given by the second print start commanding means, controlling the print controlling means so as to start to print the image on the respective nails (T) of the fingers a predetermined time after the second print start commanding means gives the command, and, responsive to the print start command given only by the second print start commanding means, controlling the print controlling means so as to start to print the image immediately on the nail of the at least one of the fingers of the one hand (51, FIG. 8).

In the respective above-mentioned embodiments, control of the image catcher 30 and the printing unit 40 can be provided in a manner similar to a control method for general printers. A pattern or design for the nail printing can be selected in a general figure selection method.

Although in the above respective embodiments the predetermined period of time required from the issue of the command from the print switch or button 52*e* or 72*e* to the start of the printing process is illustrated as about 10 seconds, it may be set to any time selected by the user. For example, when the both-hand switch or button 52*f* or 72*f* is first operated, the predetermined period of time may be set to 10 seconds; when the both-hand switch or button 52*f* or 72*f* is once more operated, the predetermined time may be set to 5 seconds; and when the both-hand switch or button 52*f* or 72*f* is still once more operated, the predetermined time may be set to 2 seconds. In addition, a changeover switch may be provided for this purpose on the control panel 52 in addition to the both-hand switch or button 52*f* or 72*f*. Such arrangement offers advantage to the user because the user can set the predetermined time to a value which the user desires or prefers.

Although in the embodiments the print controlling means is illustrated as including the image catcher 30 and the printing unit 40, the image catcher 30 is not an essential component. For example, when the nails of the thumbs or fingers are printed one by one with a pattern or design or otherwise when the respective thumbs or fingers whose nails should be printed are positioned at correct positions, no image catcher 30 may be required to be provided.

Although it is illustrated that in the printing process performed by the embodiments the images of the all thumbs or fingers whose nails should be printed are taken one by one; the respective shapes and extents of the nails are specified; and then those nails are printed sequentially, the printing process is not limited to the illustrated one. For example, the arrangement may be such that at the start of the printing process an image of all the nails of the thumbs or fingers which should be printed is first caught by the image catcher 30, the respective positions of the thumbs or fingers and the respective positions, sizes and extents of their nails are specified and then the respective nails are printed successively with a favorite pattern or design.

Although in the embodiments the print head 46 of the printing unit 40 is illustrated as movable in any of the directions intersecting at right angles by the primary and secondary carriages 42 and 45, respectively, a print head 46 having a size corresponding to the width of the a palm with fingers whose nails should be printed may be provided in a fixed manner or so as to be movable in any of the directions intersecting at right angles.

Although in the embodiments the print switch 52*e* and the both-hand switch 52*f* of FIGS. 1, 4, 5 and 9, and the print button 72*e* and the both-hand button 72*f* of FIG. 12 are illustrated as used as the operation member to give the print start command, the touch panel may be used as such.

Various modifications and changes may be made thereunto without departing from the broad spirit and scope of this invention. The above-described embodiments are intended to illustrate the present invention, not to limit the scope of the present invention. The scope of the present invention is shown by the attached claims rather than the embodiments. Various modifications made within the meaning of an equivalent of the claims of the invention and within the claims are to be regarded to be in the scope of the present invention.

What is claimed is:

1. A nail printing apparatus comprising:

a print finger insertion part into which at least one print finger that corresponds to at least one nail to be printed with an image thereon in fingers of both hands is insertable;

a print performing unit configured to perform a printing of the image on the at least one nail of the at least one print finger inserted in the print finger insertion part;

a first print start commanding unit configured to perform a command of simultaneous printing of both hands;

a second print start commanding unit configured to perform a command of a print start; and a control unit configured to control the print performing unit to start a print performance on the at least one nail immediately when the command by only the second print start commanding unit is performed, and to control the print performing unit to start the print performance after a predetermined time lapse from performing the command by the second print start commanding unit when the command by the first print start commanding unit is performed and then the command by the second print start commanding unit is performed.

2. The nail printing apparatus according to claim 1, further comprising a switching unit configured to change the predetermined time lapse from performing the command by the first print start commanding unit or by the second print start commanding unit to a start of a print performance by the print performing unit to an arbitrary length.

3. The nail printing apparatus according to claim 1, wherein the print performing unit comprises:

an image catching unit configured to catch an image of the nail of the print finger; and a printing unit configured to print the image on a nail area caught by the image catching unit.

4. The nail printing apparatus according to claim 3, further comprising a switching unit configured to change the predetermined time lapse from performing the command by the first print start commanding unit or by the second print start commanding unit to a start of a print performance by the print performing unit to an arbitrary length.

5. A print control method used in a nail printing apparatus, the nail printing apparatus comprising a print finger insertion part into which at least one print finger that corresponds to at least one nail to be printed with an image thereon in fingers of both hands is insertable a print performing unit configured to perform a printing of the image on the at least one nail of the at least one print finger inserted in the print finger insertion part, a first print start commanding unit configured to perform a command of simultaneous printing of both hands, and a second print start commanding unit configured to perform a command of a print start, the method comprising:

controlling the print performing unit to start a print performance on the at least one nail immediately when the command by only the second print start commanding unit is performed, and controlling the print performing unit to start the print performance after a predetermined time lapse from performing the command by the second print start commanding unit when the command by the first print start commanding unit is performed and then the command by the second print start commanding unit is performed.

* * * * *